A. U. PREMONT.
WIND SHIELD FOR AUTOMOBILES.
APPLICATION FILED JAN. 14, 1911.
1,078,376.
Patented Nov. 11, 1913.
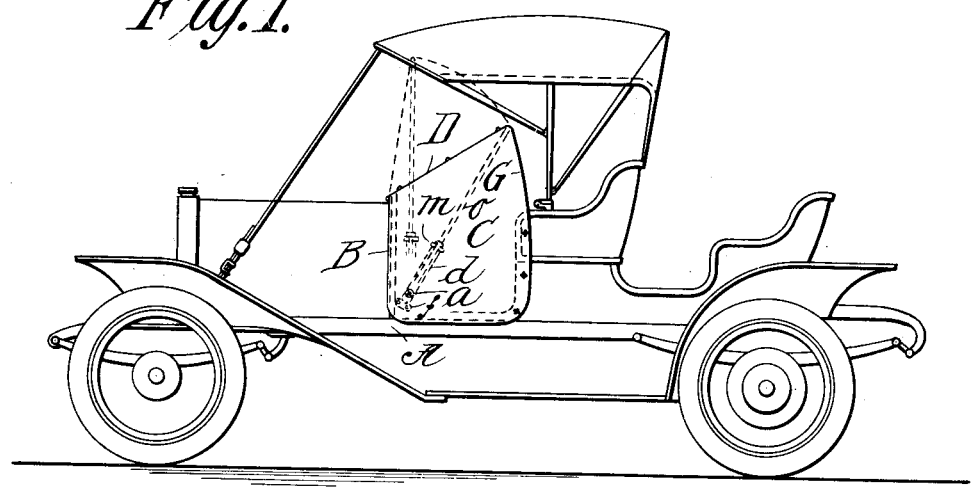
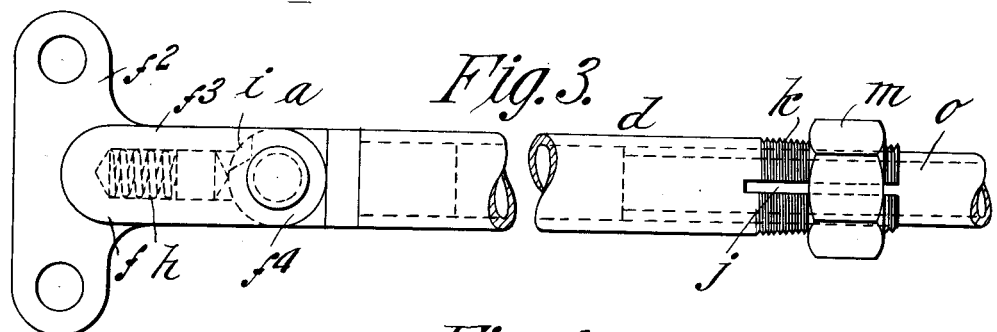
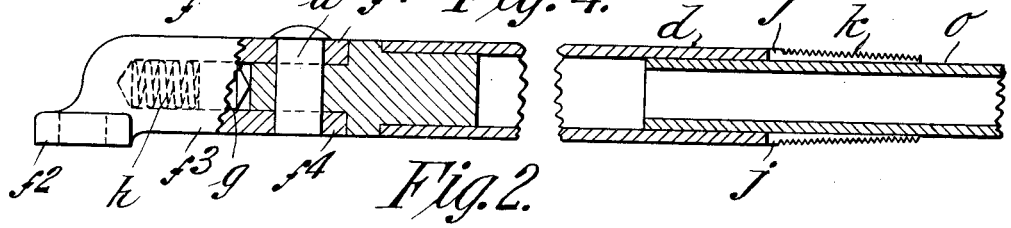
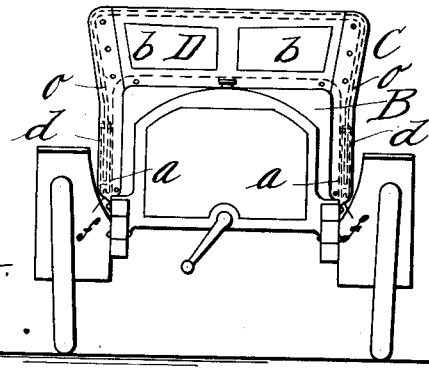
WITNESSES:
H. L. Sprague
J. D. Long
INVENTOR.
Alphonse U. Premont,
BY
ATTORNEY.

UNITED STATES PATENT OFFICE.

ALPHONSE U. PREMONT, OF SPRINGFIELD, MASSACHUSETTS.

WIND-SHIELD FOR AUTOMOBILES.

1,078,376.      Specification of Letters Patent.      Patented Nov. 11, 1913.

Application filed January 14, 1911. Serial No. 602,659.

*To all whom it may concern:*

Be it known that I, ALPHONSE U. PREMONT, a British subject, and resident of Springfield, in the county of Hampden and State of Massachusetts, have invented certain new and useful Improvements in Wind-Shields for Automobiles, of which the following is a full, clear, and exact description.

One object of this invention is to provide a wind shield for automobiles and other vehicles which is not only entirely efficient and desirable, but is extremely simple and inexpensive of construction. And another object is to so construct the device or appliance that it may be quickly and easily converted into a storm front for the vehicle.

The invention comprises in combination with the body of a vehicle having a dash board, a yoke shaped frame pivotally connected on the body near the base of the dash board and normally upwardly and rearwardly inclined, and a storm shield of flexible material connected to the dash board and extending from the upper edge thereof to, and connected with the upper portion of the pivoted yoke shaped frame, all whereby the upwardly and rearwardly inclined wind shield may be forwardly swung so that when a person is about to take his place upon the seat the device may be temporarily disposed in a non-obstructing position.

The invention, furthermore, consists in certain combinations and arrangements of parts to be hereinafter set forth.

The invention is described in conjunction with the accompanying drawings and is defined in the claim.

In the drawings:—Figure 1 is a side elevation of an automobile having a top and showing my improved wind shield thereon; Fig. 2 is a front elevation of the machine with the wind shield thereon; Figs. 3 and 4 are views illustrating details of construction hereinafter referred to.

In the drawings, A represents the body of an automobile, of which B is the dashboard and C represents a yoke shaped frame having opposite members thereof in substantially vertical planes and composed of extensible sections with means for confining them in their contracted or extended relations. The opposite members of the yoke shaped frame are pivotally connected as indicated at $a$ to the body of the vehicle near the dash-board and also near the flooring of the body.

The yoke shaped frame C has normally a rearward and upward inclination about as indicated in Fig. 1, so that, at all times its cross member or leg uniting portion thereof is somewhat higher than the dash-board, but below the natural position of the head of the occupants of the seat.

D represents the storm shield which is made of flexible material, connected to the dash-board and extending from the upper edge of the latter to, and connected with, the upper transverse portion of the pivoted yoke shaped frame C. This storm shield may be made of leather, rubber, cloth, or any of the fabrics suitable therefor, and it preferably has panes $b\ b$ of transparent material such as flexible celluloid.

As specifically constructed, the yoke shaped frame C includes a pair of tubular sections $d\ d$ connected by the pivot $a$ to brackets $f$ screwed or bolted on the body. Each bracket comprises an attachment portion or foot piece $f^2$ and a barrel portion $f^3$ terminating in ear lugs $f^4$,—each barrel containing a catch bolt $g$ and a projecting spring $h$ therefor. The tubular sections $d\ d$ have in their edge portions adjacent their pivots each a catch notch $i$, as indicated in Fig. 3; and the upper extremity of each tubular section $d$ is split, $j\ j$ representing the kerfs by which it is rendered constrictive and being externally tapered and having screw threads $k$ for the reception thereon of the nut $m$, provision is thus made for a clamping bind of the other sections $o\ o$ or leg like portions of the bow shaped part which constitutes the upper part of the extensible and contractible yoke.

Side aprons may be employed of any size and character, and a form of side apron is represented in the present drawing by the letter G.

The yoke shaped frame C normally in the inclined position indicated in Fig. 1, and free or unlocked at the pivoted lower extremities thereof, permits a peculiar automatic action of the wind shield when affected by head on wind pressures of varying intensities,—that is, while traveling the impingement of the wind against the front of the wind shield will cause a bellying of the flexible material and incidentally therewith a forward tilting of the yoke frame, more or less in proportion to the wind force, and thus an effective scoop is provided for the deflection of the wind upwardly and rearwardly over the head of the rider.

Of course, it is apparent that when the rider wishes to enter or leave the seat, the device may be swung forwardly. When swung forwardly, the yoke frame may be retained by the catch bolt having its conical or beveled point in engagement in the aforementioned catch notch $i$; and while the bolt and notch constitute in a sense a locking means for the yoke frame, such locking means is not of such positive character that it may not be overcome for release without manipulation of the interengaging parts, by the exercise of force manually applied to the yoke frame.

At times when the device is to be utilized as a wind shield it is only necessary to swing the yoke frame to its vertical position and move the upper section of such frame upwardly sufficiently far to carry the then vertically disposed flexible front D to a taut condition, the loosening and tightening of the nuts $m$ being necessary, as manifest.

I claim:—

The combination with the body of a vehicle having a dash-board, of a pair of brackets secured at opposite sides of the body near the base of the dash-board and each comprising a barrel member formed with a bore therein opening to the upper end thereof, and having upwardly extending opposing ear lugs, and said barrel having a catch bolt and a bolt-projecting spring therein, a pair of tubular sections provided with circular edged hinge members disposed between said ear lugs, and pivoted thereto, having edge portions thereof adjacent the pivot provided with catch notches, and said tubular sections having their upper end portions longitudinally split, externally tapered and screw threaded and having constricting nuts thereon, further sections telescopically engaged in the pivoted sections and having a cross member uniting their upper end portions, and a storm shield of flexible material extending from the upper edge of the dash-board to, and connected with, said section-uniting cross member.

Signed by me at Springfield, Mass., in presence of two subscribing witnesses.

ALPHONSE U. PREMONT.

Witnesses:
Wm. S. Bellows,
G. R. Driscoll.

---

Copies of this patent may be obtained for five cents each, by addressing the "Commissioner of Patents, Washington, D. C."